(12) United States Patent
Vidyanand et al.

(10) Patent No.: US 6,341,018 B1
(45) Date of Patent: Jan. 22, 2002

(54) PREPROCESSING METHOD FOR A VARIABLE DATA PRINT JOB SYSTEM

(75) Inventors: Ramgopal Vidyanand, Cupertino, CA (US); James K. Schwarz, Jr., Boulder, CO (US); Margaret Motamed, Foster City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/481,736

(22) Filed: Jan. 11, 2000

Related U.S. Application Data

(63) Continuation-in-part of application No. 09/312,908, filed on May 17, 1999, and a continuation-in-part of application No. 09/298,639, filed on Apr. 23, 1999.

(51) Int. Cl.$^7$ .......................... B41B 15/00; B41J 15/00; G06F 15/00

(52) U.S. Cl. ................... 358/1.18; 358/1.16; 358/1.15; 358/1.1

(58) Field of Search ............................ 358/1.18, 1.16, 358/1.15, 1.1, 1.7, 540, 462, 450, 426, 433, 448; 382/235, 303, 304

(56) References Cited

FOREIGN PATENT DOCUMENTS

EP           0806721 A1  * 12/1997  .............. G06F/3/12

* cited by examiner

*Primary Examiner*—Edward Coles
*Assistant Examiner*—Twyler Lamb
(74) *Attorney, Agent, or Firm*—Michael A. Glenn

(57) ABSTRACT

Methods of translating a print object stream into a print job stream are claimed. The print object stream contains a succession of print objects. The print job stream contains print job objects.

36 Claims, 13 Drawing Sheets

PREPROCESSING METHOD FOR A VARIABLE DATA PRINT JOB SYSTEM

This application claims priority as a continuation in part and incorporates by reference U.S. application Ser. No. 09/312,908, "Variable Data Print Job System" filed May 17, 1999, and U.S. application Ser. No. 09/298,639, "Page Independent Multiple RIP System" filed Apr. 23, 1999.

TECHNICAL FIELD

This invention relates to translation of computer data to be printed into an optimized print job stream.

BACKGROUND ART

FIG. 1 depicts a common prior art situation in which two frames 10 and 20, which are part of a succession 18 of frames, both contain a common graphical object 2. Arrow 14 designates the linkage of the background image 2 in frame 10. Arrow 16 designates the linkage of the unique information 12 embedded in frame 10. Arrow 24 designates the linkage of the background image 2 in frame 20. Arrow 26 designates the linkage of the unique information 12 embedded in frame 20.

There are many kinds of common documents incorporating redundant use of large graphical data components on repeated pages, slides or frames. Such documents include but are not limited to visual presentations created with presentation development tools such as Powerpoint™ by the Microsoft Corporation. These documents often contain one or more common backgrounds or background components entailing a large amount of graphical data which is used on several separate pages, or several times on the same page, or possibly a combination of several pages and more than once on a single page. Such elements are also known as frame, slide or page layouts in certain situations. Examples of such redundant graphical data can be seen in repeated use of logos, clipart images, maps and pictures throughout a document.

Often these background graphical components 2 are quite large and complex graphical objects, involving subtle graphical operations such as blending more than one color across the background. A sunset 2, as indicated in FIG. 1, exemplifies such a background graphical component. The rest of the data contained in the frame represents a small amount of data compared to such background components. By way of example, component 2 may involve several million bytes whereas components 12 and 22 may each involve a few hundred or thousands of bytes. The repeated transmission of such background graphical data is redundant, and thus inefficient, since it consumes bandwidth delivered to the printer. It also inefficiently requires repeated processing by the printer to generate each frame.

What is needed is a mechanism by which such redundant graphical data can be determined, expressed as a master record, that master record sent to the printer system a minimum number of times, and instances of its use parameterized and sent to the printer referencing the master record.

DISCLOSURE OF THE INVENTION

This invention solves the disclosed needs regarding the prior art.

One aspect of the invention is a method of translating a print object stream containing a succession of print objects into a print job stream containing print job objects. The print object stream is examined to create a collection of at least one master record. The print object stream is processed to create variable data objects as instances of at least one of the master records of the collection of the master records in the print job stream.

This method advantageously removes redundancies from large background or layout graphical objects commonly employed in documents and presentation materials. This significantly reduces the bandwidth requirements to send a print job stream to a printer. It significantly reduces the processing overhead at the printer involved in recalculating the common background or layout objects.

Another aspect of the invention includes a method of translating a print object stream containing a succession of print objects into a print job stream containing master records and instance records. A graphical print object library containing a graphical object definition is maintained. A current print object is created from getting the next print object. The method determines if the current print object belongs to the graphical print object library to create a found prior graphical objection definition. Processing the current print object as instance of the found graphical object definition occurs whenever the current print object belongs to the graphical print object library. The current print object is sent on whenever the current print object does not belong to the graphical print object library.

This method advantageously removes redundancies from large background or layout graphical objects commonly employed in documents and presentation materials. This significantly reduces the bandwidth requirements to send a print job stream to a printer. It significantly reduces the processing overhead at the printer involved in recalculating the common background or layout objects.

Embodiments of this method are advantageously implemented as a filtering style, program code component. Other embodiments are advantageously implemented as a batch style, program code component.

These and other advantages of the present invention will become apparent upon reading the following detailed descriptions and studying the various figures of the drawings.

DETAILED DESCRIPTION OF THE INVENTION

Figure 1:
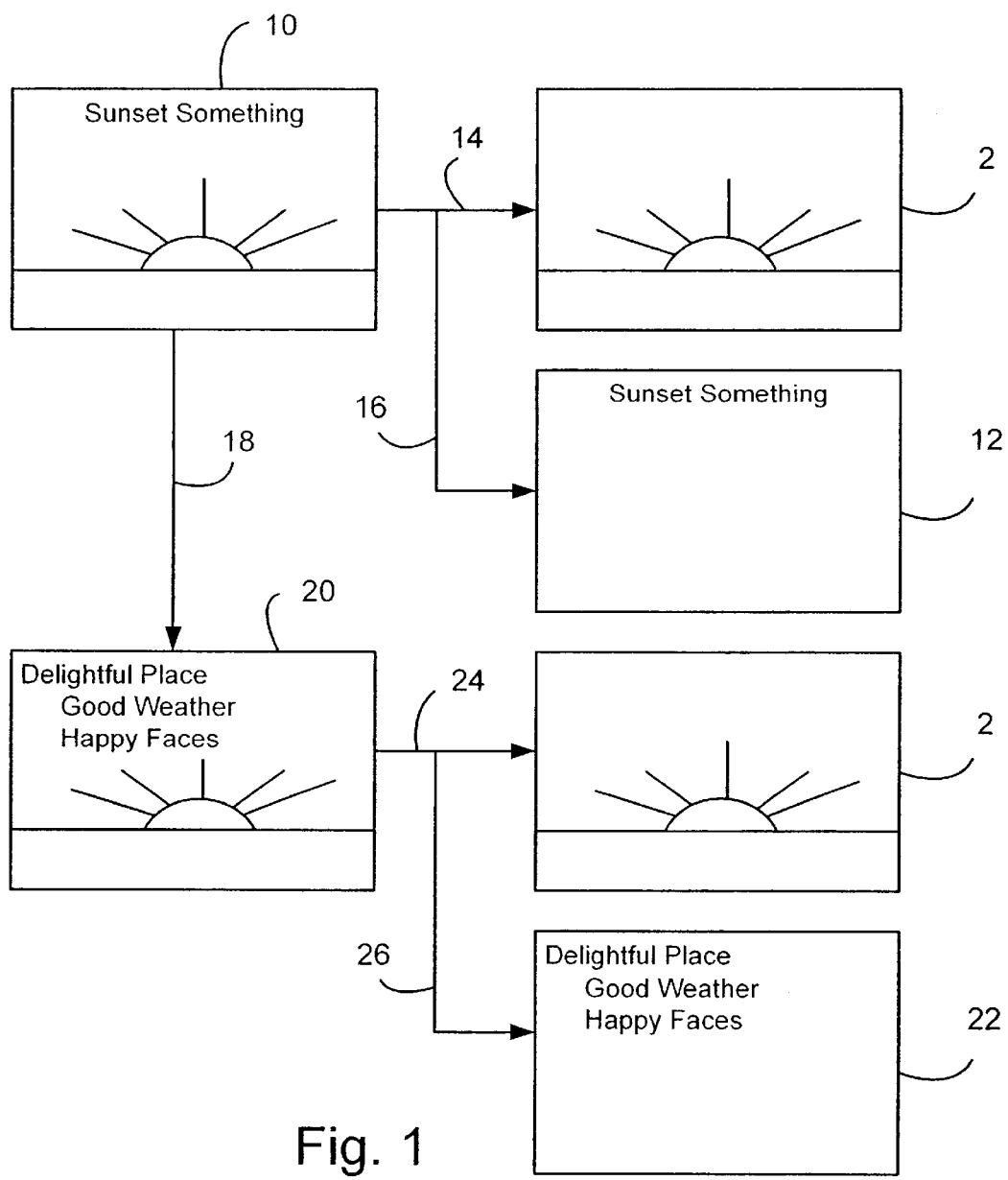
FIG. 1 depicts a common prior art situation.

FIG. 1 depicts a common prior art situation in which two frames 10 and 20, which are part of a succession 18 of frames, both containing a common graphical object 2. Arrow 14 designates the linkage of the background image 2 in frame 10. Arrow 16 designates the linkage of the unique information 12 embedded in frame 10. Arrow 24 designates the linkage of the background image 2 in frame 20. Arrow 26 designates the linkage of the unique information 12 embedded in frame 20.

Figure 2:
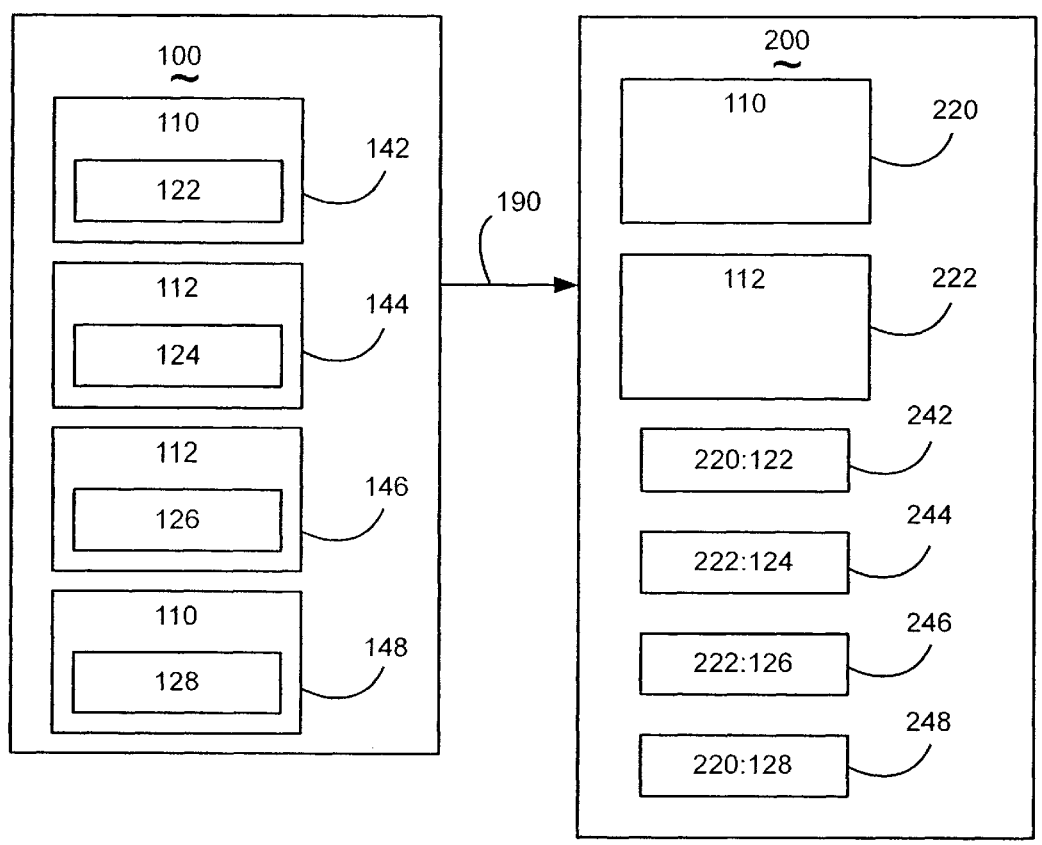
FIG. 2 illustrates the translation of a print object stream into an optimized print job stream in accordance with an aspect of the invention.

FIG. 2 illustrates the translation of a print object stream into an optimized print job stream in accordance with an aspect of the invention.

A print object stream 100 is represented as a collection of frames 142, 144, 146 and 148. Each of these frames contains one of two background graphical object components 110 and 112. Each frame further possesses additional variable data. Frames 142, 144, 146 and 148 respectively contain background graphical object 110, 112, 112 and 110. Frames 142, 144, 146 and 148 respectively contain variable data 122, 124, 126 and 128.

The frame variable data may often be represented as a list of parameters applied to the background graphical object to further create the visual image of the frame. Frame variable data parameters may include but are not limited to text parameters, one or more scaling factors and orientation parameters. Orientation parameters include but are not limited to rotation parameters in 2 or 3 dimensions, parameters indicating the "flipping" or mirroring of the background graphical object.

Translation 190 converts print object stream 100 into print job stream 200. Print job stream 200 contains a master record 220 based upon background 110 from print object stream 100 and a master record 222 based upon background 112 from print object stream 100.

Variable print data record 242 is translated 190 from frame 142 of print object stream 100. Variable print data record 242 contains a reference to master record 220 and a representation of the variable data 122 extracted from frame 142.

Variable print data record 244 is translated 190 from frame 144 of print object stream 100. Variable print data record 244 contains a reference to master record 222 and a representation of the variable data 124 extracted from frame 144.

Variable print data record 246 is translated 190 from frame 146 of print object stream 100. Variable print data record 246 contains a reference to master record 222 and a representation of the variable data 126 extracted from frame 146.

Variable print data record 248 is translated 190 from frame 148 of print object stream 100. Variable print data record 248 contains a reference to master record 220 and a representation of the variable data 128 extracted from frame 148.

Figure 3:
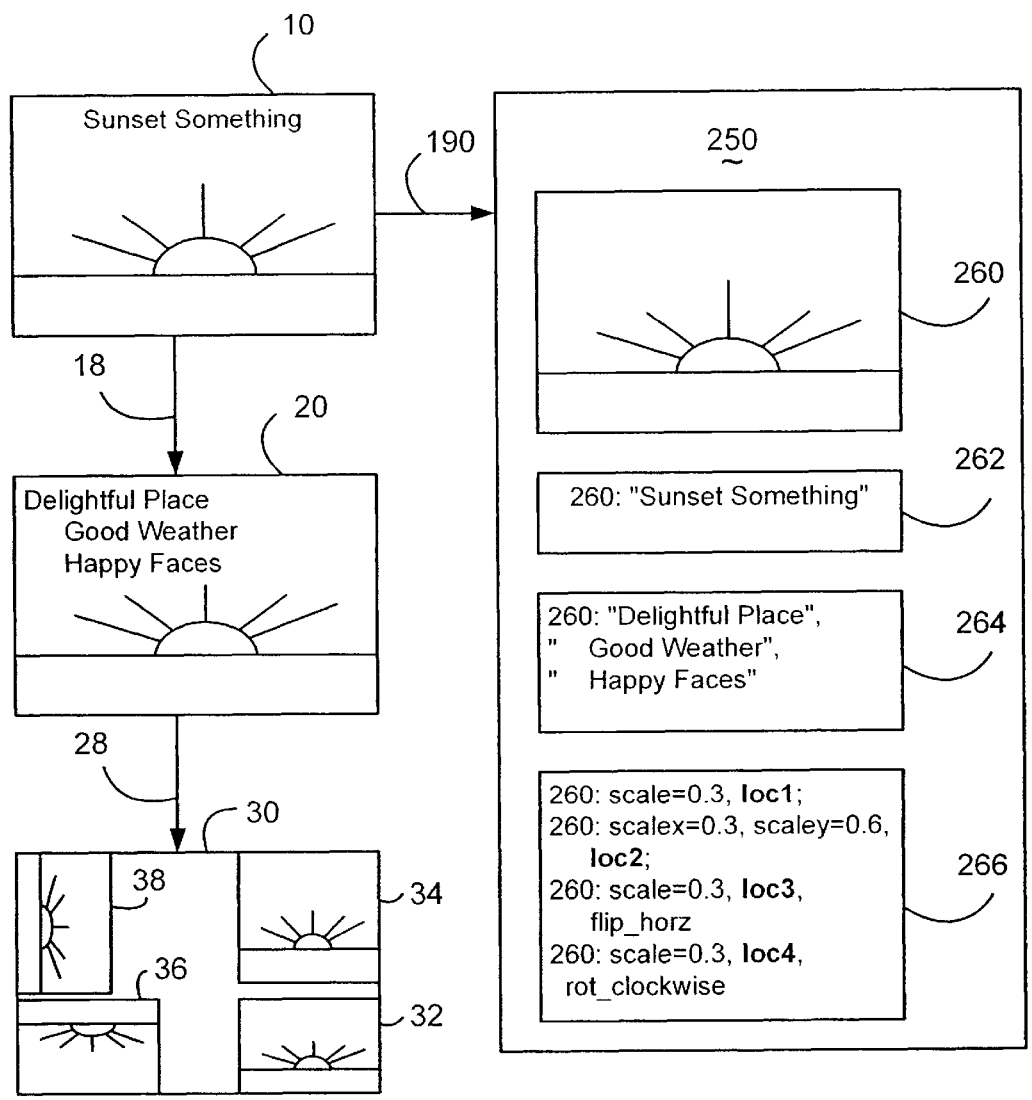
FIG. 3 illustrates the translation of a print object stream including the common situation from FIG. 1 into an optimized print job stream as in FIG. 2 in accordance with an aspect of the invention.

FIG. 3 illustrates the translation of a print object stream including the common situation from FIG. 1 into an optimized print job stream as in FIG. 2 in accordance with an aspect of the invention. The two frames 10 followed 18 by are further followed 28 by frame 30, all containing a common graphical object 2.

Frame 30 contains four instances 32, 34, 36 and 38 of the background graphical object 2. Instance 32 is positioned at loc1 and scaled both horizontally and vertically by an exemplified value of 0.3. Instance 34 is positioned at loc2, scaled horizontally by an exemplified value of 0.3 and scaled vertically by an exemplified value of 0.6. Instance 36 is positioned at loc3 and scaled both horizontally and vertically by an exemplified value of 0.3 and oriented as indicated, which can be expressed as flipping about the horizontal axis. Instance 38 is positioned at loc4 and scaled both horizontally and vertically by an exemplified value of 0.3 and oriented as indicated, which can be expressed as rotating clockwise.

Translation 190 of the print object stream produces the optimized print job stream 250. Print job stream 250 contains a master record 260 based upon background 2 from print object stream.

Print object 10 is translated 190 into instance record 262 referencing master record 260 and containing a parameter represented as a list of one parameter represented as "Sunset Something", which was extracted from frame 10.

Print object 20 is translated 190 into instance record 264 referencing master record 260 and containing a parameter represented as list of "Delightful Place", "Good Weather" and "Happy Faces", which was extracted from frame 20.

Print object 30 is translated 190 into instance record 266 referencing four instances of master record 260. The first instance has parameters represented as "scale=0.3, loc1"

extracted from instance 32. The second instance has parameters represented as "scalex=0.3, scaley=0.6, loc2" extracted from instance 34. The third instance has parameters represented as "scale=0.3, loc3, flop_horz" extracted from instance 36. The fourth instance has parameters represented as "scale=0.3, loc4, rot_clockwise" extracted from instance 38.

Note that while orientation factors of rotation and mirroring have been shown, orientation may also include and is not limited to rotation and mirroring about other lines, which may or may not reside in the viewing plane. Further, rotation may be by angles other than right angles. Orientation may be designated in terms of degrees, radians or any other units as designated by the user or application environment.

Further note that orientation parameters may be mixed with positioning as well as text parameters in certain embodiments.

Figure 4:
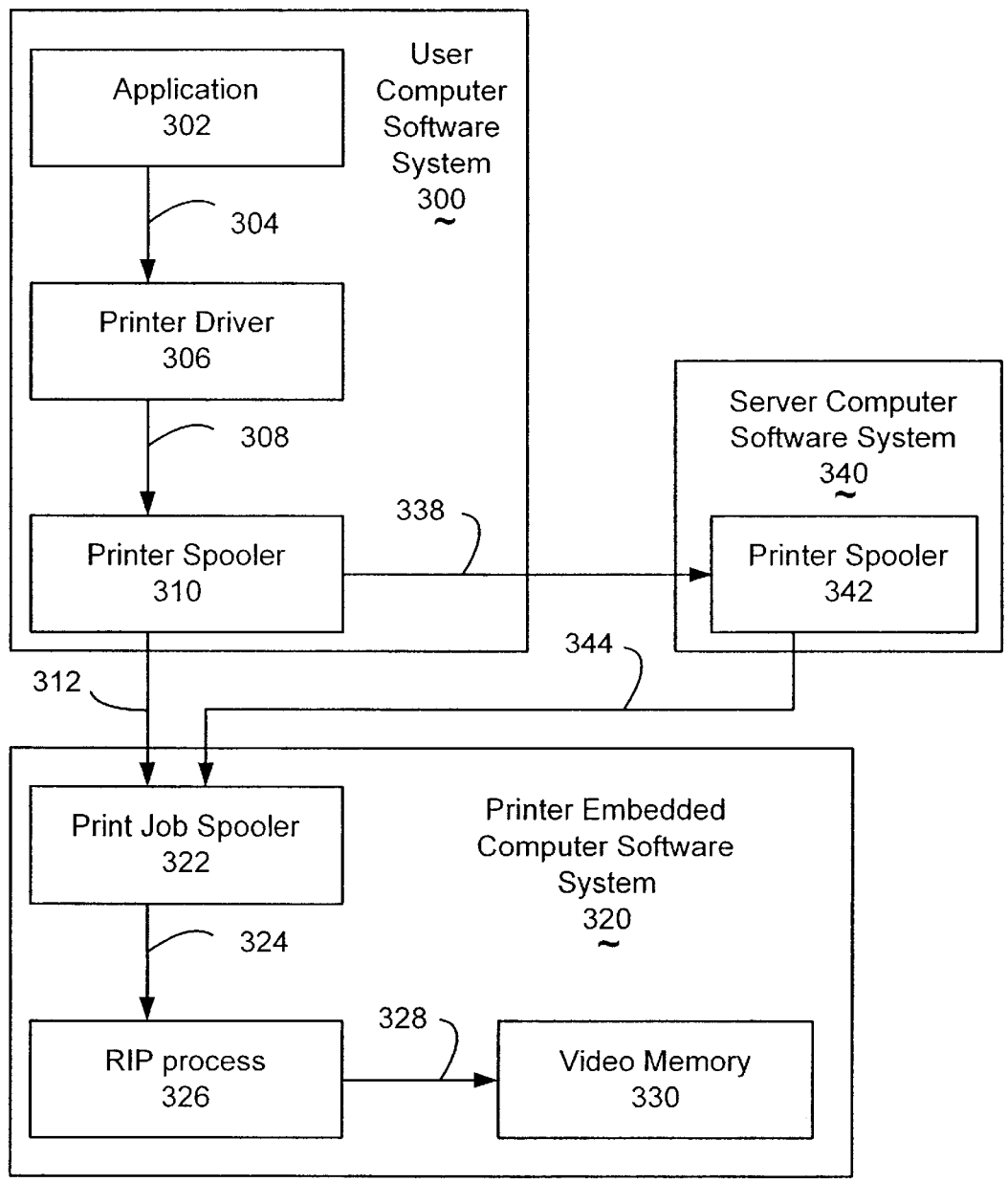
FIG. 4 depicts a software data flow diagram illustrating how several embodiments of the invention would operate in accordance with an aspect of the invention.

FIG. 4 depicts a software data flow diagram illustrating how several embodiments of the invention would operate in accordance with an aspect of the invention.

User computer software system 300, server computer software system 340 as well as printer embedded computer software system 320 each resides in computer readable memory accessibly coupled to their respective computer systems. As used herein a computer system includes at least one instruction processor, which can access the coupled computer readable memory, and execute the instructions residing therein. An instruction processor as used herein includes but is not limited to a microprocessor, multiple microprocessors, an embedded controller, a finite state machine, SIMD (Single Instruction Multiple Datapath) processor or MIMD (Multiple Instruction Multiple Datapath) processor. These instruction processors as used herein may include but are not limited to CISC, RISC or VLIW instruction processing architectures.

User computer software system 300, server computer software system 340 as well as printer embedded computer software system 320 each contains an operating system in certain embodiments. The operating systems of 300, 340 and 320 may differ in certain embodiments. In certain further embodiments, the respective operating system is a real-time operating system supporting the concurrent operation of several program code components. In certain further embodiments, these program code components include but are not limited to threads. In certain other further embodiments, these program code components may include methods of objects. In certain further embodiments, these program code components communicate data and commands between themselves as indicated by the arrows of this figure.

User computer software system 300 contains an application 302 which sends 304 data to printer driver 306 which in turn sends 308 data to printer spooler 310. In certain embodiments, printer spooler 310 sends 312 data to the print job spooler 322 in printer embedded computer software system 320. Server computer software system 340 printer spooler 342 then sends 344 data to print job spooler 322 in printer embedded computer software system 320. In certain other embodiments, printer spooler 310 sends 338 data to printer spooler 342 in server computer software system 340.

Printer embedded computer software system 320 further contains a RIP process 326 and video memory 330. Print job spooler 322 sends 324 data to RIP process 326. RIP process 326 sends 328 data to video memory 330.

Certain embodiments can be implemented as program code components residing in computer readable memory 300 to perform the translating methods in accordance with an aspect of the invention.

As used herein, the word object will have several uses and meanings in different embodiments. In certain embodiments, the word object will refer to a collection of data. In certain further embodiments, the word object will refer to a collection of data organized as data components. In certain further embodiments, the word object will refer to a collection of data containing multiple organizations of data components. In certain further embodiments, the word object will refer to a collection of data with at least one method function or operation associated with it. In certain further embodiments, the word object will refer to a collection of data with at least one method function or operation associated with it and operating upon the data collection. In certain further embodiments, the word object will refer to a collection of data with at least one method function or operation associated with it which are controlled by the collective state of the data collection. In certain further embodiments, the word object will refer to a collection of data with at least one method function or operation associated with it activated by one or more events. In certain further embodiments, the word object will refer to a collection of data with at least one method function or operation associated with it activated by events involving messages. In certain further embodiments, the word object will refer to a collection of data with at least one method function or operation associated with it with messages being treated as a component of the data collection.

A further embodiment includes at least one of the translating program code components in the user computer coupled computer readable memory 300 executes as an executable sub-program invoked within a user operated application program 302 and sending 304 the print job stream to a print driver 306.

Another further embodiment includes at least one of the translating program code components in the user computer coupled computer readable memory 300 executing as a plug-in of a user operated application program 302 to generate an object which is then sent 304 to the printer driver 306.

Another further embodiment includes at least one of the translating program code components in the user computer coupled computer readable memory 300 executes as a filter 304 between application program 302 and print driver 306.

Another further embodiment includes at least one of the translating program code components in the user computer coupled computer readable memory 300 executes as print driver 306.

Another further embodiment includes at least one of the translating program code components in the user computer coupled computer readable memory 300 executes as a filter 308 between print driver 306 and printer spooler 310.

Another further embodiment includes at least one of the translating program code components in the user computer coupled computer readable memory 300 executes as a filter 308 between print driver 306 and printer spooler 310.

Another further embodiment includes at least one of the translating program code components in the user computer coupled computer readable memory 300 executes as printer spooler 310.

Another embodiment includes at least one of the translating program code components residing in the server computer coupled computer readable memory 340.

Another embodiment includes at least one of the translating program code components residing in the printer embedded computer coupled computer readable memory 320. In certain embodiments, the program code components reside in print job spooler 322. In certain embodiments, the program code components reside as a filter 324 between print job spooler 322 and RIP process 326.

Figure 5:
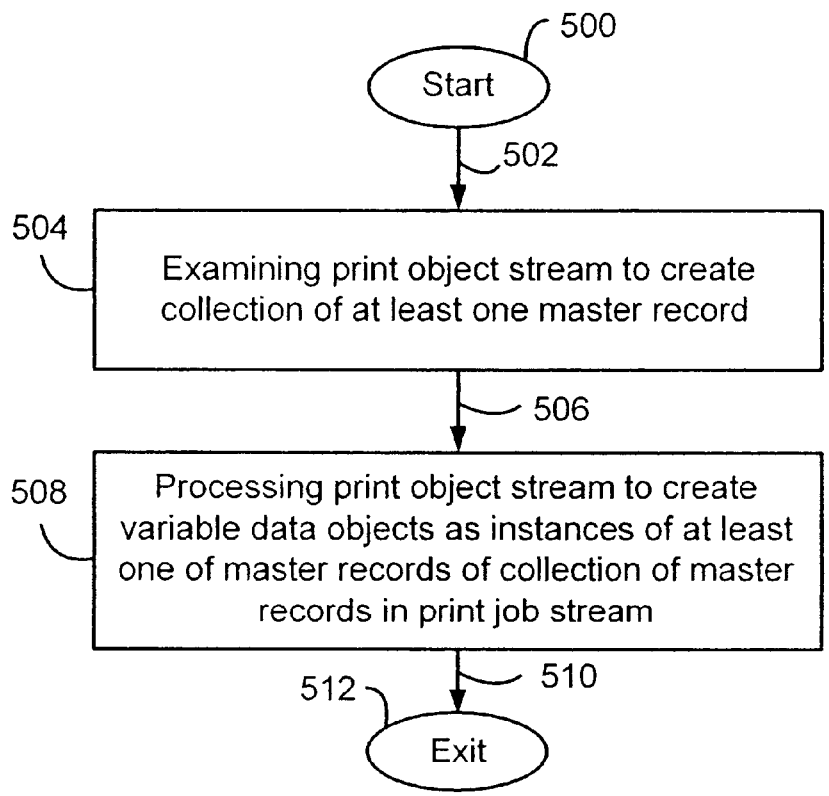
FIG. 5 depicts a flowchart for translating a print object stream containing a succession of print objects into a print job stream containing print job objects of certain embodiments in accordance with an aspect of the invention.

FIG. 5 depicts a flowchart for translating a print object stream containing a succession of print objects into a print job stream containing print job objects of certain embodiments in accordance with an aspect of the invention.

Operation 500 starts the operations of this flowchart. Arrow 502 directs the flow of execution from operation 500 to operation 504. Operation 504 performs examining the print object stream to create a collection of at least one master record. Arrow 506 directs execution from operation 504 to operation 508. Operation 508 performs processing the print object stream to create variable data objects as instances of at least one of the master records of the collection of the master records in the print job stream. Arrow 510 directs execution from operation 508 to operation 512. Operation 512 terminates the operations of this flowchart.

Figure 6:
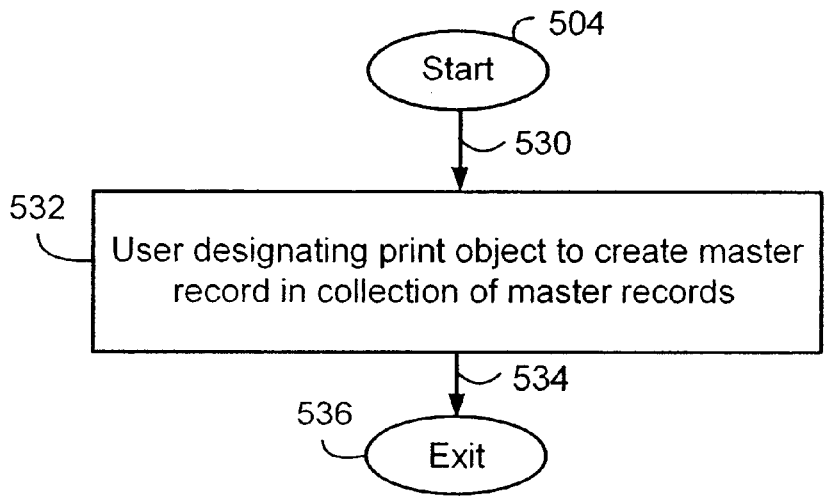
FIG. 6 depicts a detail flowchart of operation 504 of FIG. 5 in accordance with an aspect of the invention supporting user designation of master records.

FIG. 6 depicts a detail flowchart of operation 504 of FIG. 5 in accordance with an aspect of the invention supporting user designation of master records.

Arrow 530 directs the flow of execution from starting operation 504 to operation 532. Operation 532 supports a user designating a print object to create a master record in the collection of master records. Arrow 534 directs execution from operation 532 to operation 536. Operation 536 terminates the operations of this flowchart.

Note that in certain embodiments, the user may designate more than one master record. In certain embodiments, the user may copy or move print objects to specific locations in the print job stream as part of designating these print objects. In certain further embodiments, these locations may be at the beginning of the print object stream. In other further embodiments, these locations may be at the end of the print object stream. In certain embodiments the user may label or tag print objects as part of designating these print objects. In certain embodiments, the user may designate these print object by selecting them from an array of snapshots of the print objects.

Figure 7:
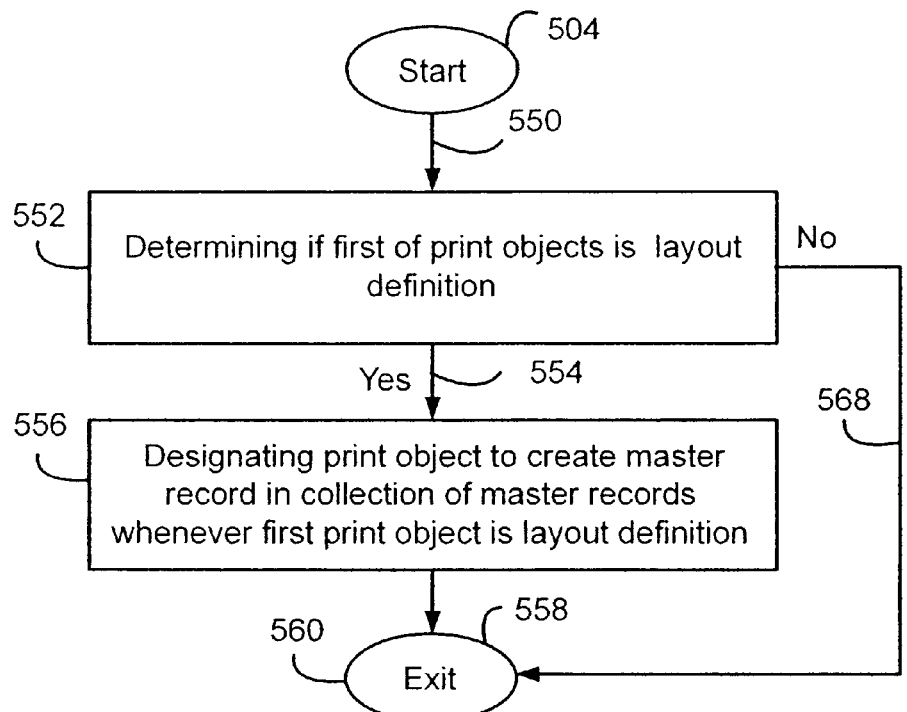
FIG. 7 depicts a detail flowchart of operation 504 of FIG. 5 in accordance with an aspect of the invention supporting designating layout definitions as master records.

FIG. 7 depicts a detail flowchart of operation 504 of FIG. 5 in accordance with an aspect of the invention supporting designating layout definitions as master records.

Arrow 550 directs the flow of execution from starting operation 504 to operation 552. Operation 552 performs determining if a first of the print objects is a layout definition. Arrow 554 directs execution from operation 552 to operation 556. Operation 556 performs designating a print object to create a master record in the collection of master records whenever the first print object is the layout definition. Arrow 558 directs execution from operation 556 to operation 560. Operation 560 terminates the operations of this flowchart.

Note that in certain embodiments, this flowchart may be implemented for a flag driven processor in which branching operations are minimized. In such implementations, operation 556 would be performed based upon the flag state. In certain alternative embodiments, a branching mechanism might be employed. Arrow 554 would be active directing execution whenever the first print object is the layout definition. Arrow 568 would be active whenever the first print object is the layout definition.

Figure 8:
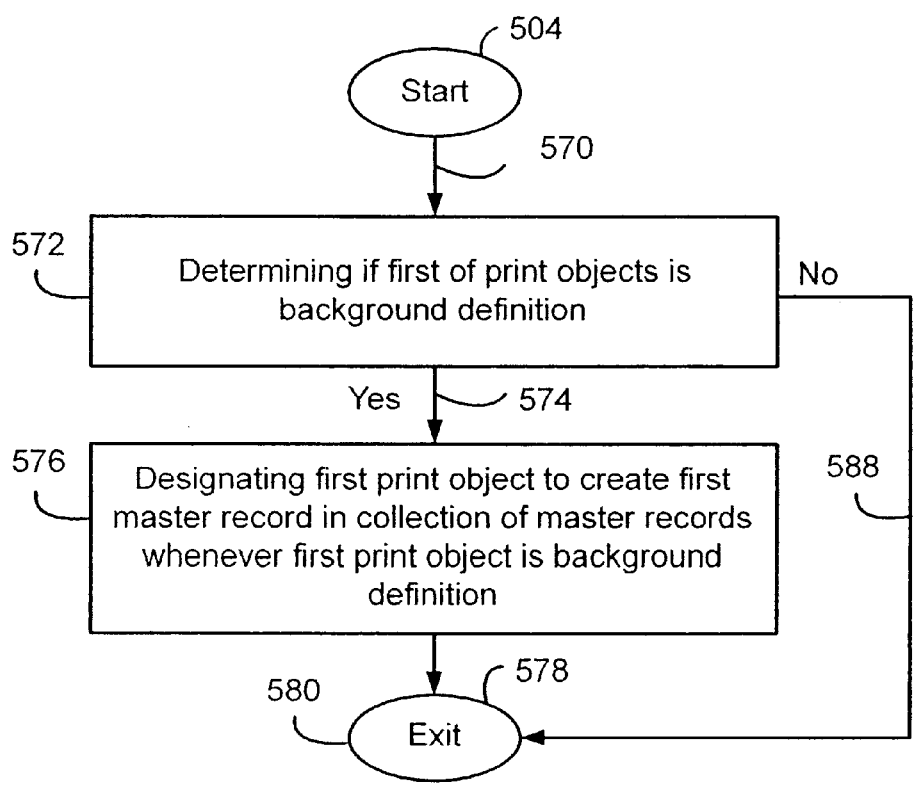
FIG. 8 depicts a detail flowchart of operation 504 of FIG. 5 in accordance with an aspect of the invention supporting designating background definitions as master records.

FIG. 8 depicts a detail flowchart of operation 504 of FIG. 5 in accordance with an aspect of the invention supporting designating background definitions as master records.

Arrow 570 directs the flow of execution from starting operation 504 to operation 572. Operation 572 performs determining if a first of the print objects is a background definition. Arrow 574 directs execution from operation 572 to operation 576 whenever the first print object is the background definition. Operation 576 performs designating the first print object to create a first master record in the collection of master records whenever the first print object is the background definition. Arrow 578 directs execution from operation 576 to operation 580. Operation 580 terminates the operations of this flowchart.

Arrow 588 directs execution from operation 572 to operation 580 whenever the first print object is not the background definition. Operation 580 terminates the operations of this flowchart.

Note that in certain embodiments, this flowchart may be implemented for a flag driven processor in which branching operations are minimized. In such implementations, operation 576 would be performed based upon the flag state. In certain alternative embodiments, a branching mechanism might be employed. Arrow 574 would be active directing execution whenever the first print object is the background definition. Arrow 588 would be active whenever the first print object is not the background definition.

Figure 9:
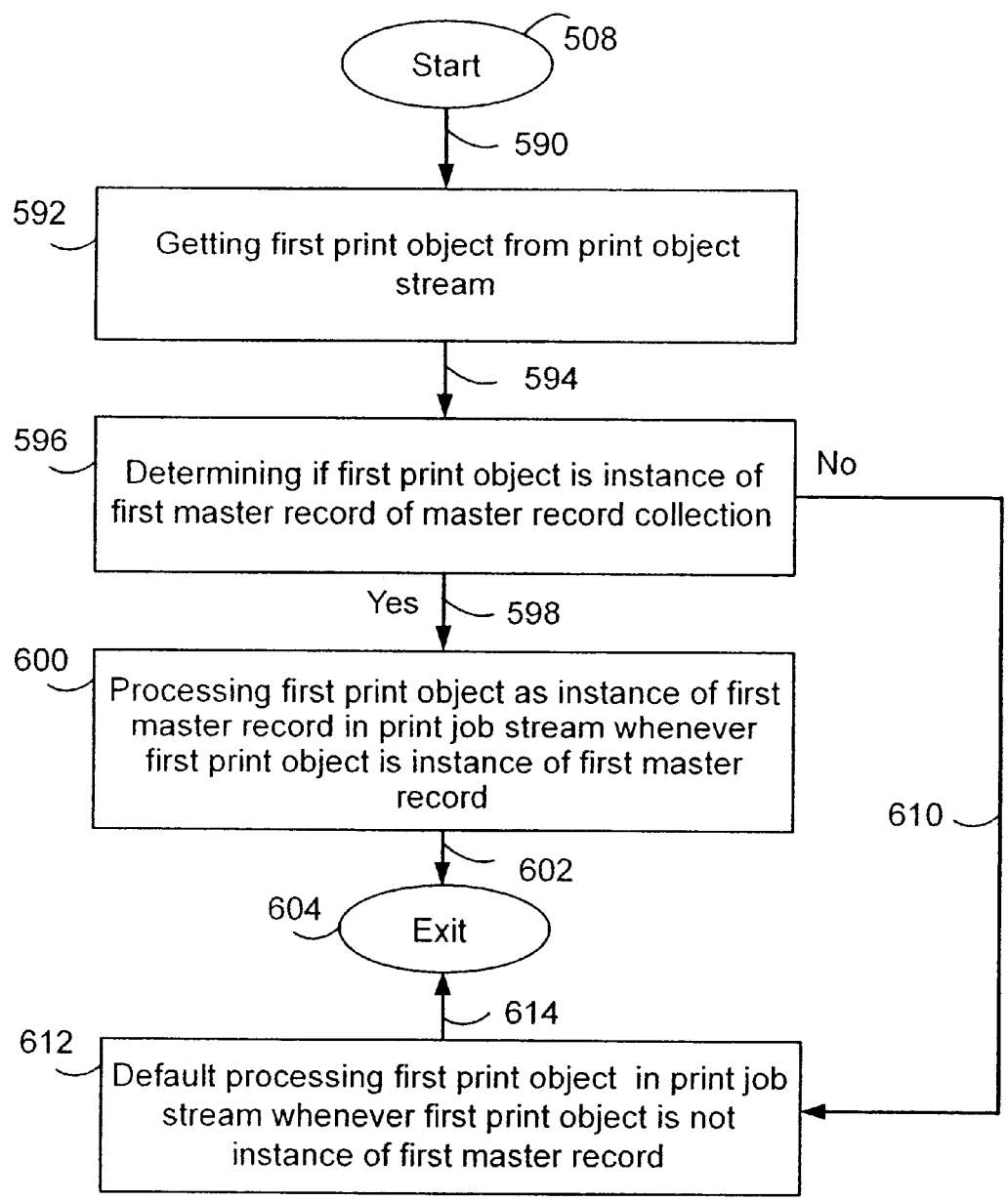
FIG. 9 depicts a detail of operation 508 of FIG. 5 in accordance with an aspect of the invention supporting processing a print object as an instance of a master record.

FIG. 9 depicts a detail of operation 508 of FIG. 5 in accordance with an aspect of the invention supporting processing a print object as an instance of a master record.

Arrow 590 directs the flow of execution from starting operation 508 to operation 592. Operation 592 performs getting a first print object from the print object stream. Arrow 594 directs execution from operation 592 to operation 596. Operation 596 performs determining if the first print object is an instance of a first master record of the master record collection. Arrow 598 directs execution from operation 596 to operation 600 whenever the first print object is an instance of the first master record. Operation 600 performs processing the first print object is as an instance of the first master record in the print job stream whenever the first print object is instance of the first master record. Arrow 602 directs execution from operation 600 to operation 604. Operation 604 terminates the operations of this flowchart.

Arrow 610 directs the flow of execution from starting operation 5596 to operation 612 whenever the first print object is not an instance of the first master record. Operation 612 performs default processing the first print object in the print job stream whenever the first print object is not an instance of the first master record. Arrow 614 directs execution from operation 612 to operation 604. Operation 604 terminates the operations of this flowchart.

Note that in certain embodiments, this flowchart may be implemented for a flag driven processor in which branching operations are minimized. In such implementations, operations 600 and 612 would be performed based upon the flag state. In certain alternative embodiments, a branching mechanism might be employed. Arrow 598 would be active directing execution whenever the first print object is an instance of the first master record. Arrow 614 would be active whenever the first print object is not an instance of the first master record.

Note that in certain embodiments, there may be more than one master record in master record collection. In certain further embodiments, operation 596 acts to search the master record collection to find a first master record of which the first print object is an instance.

Figure 10:
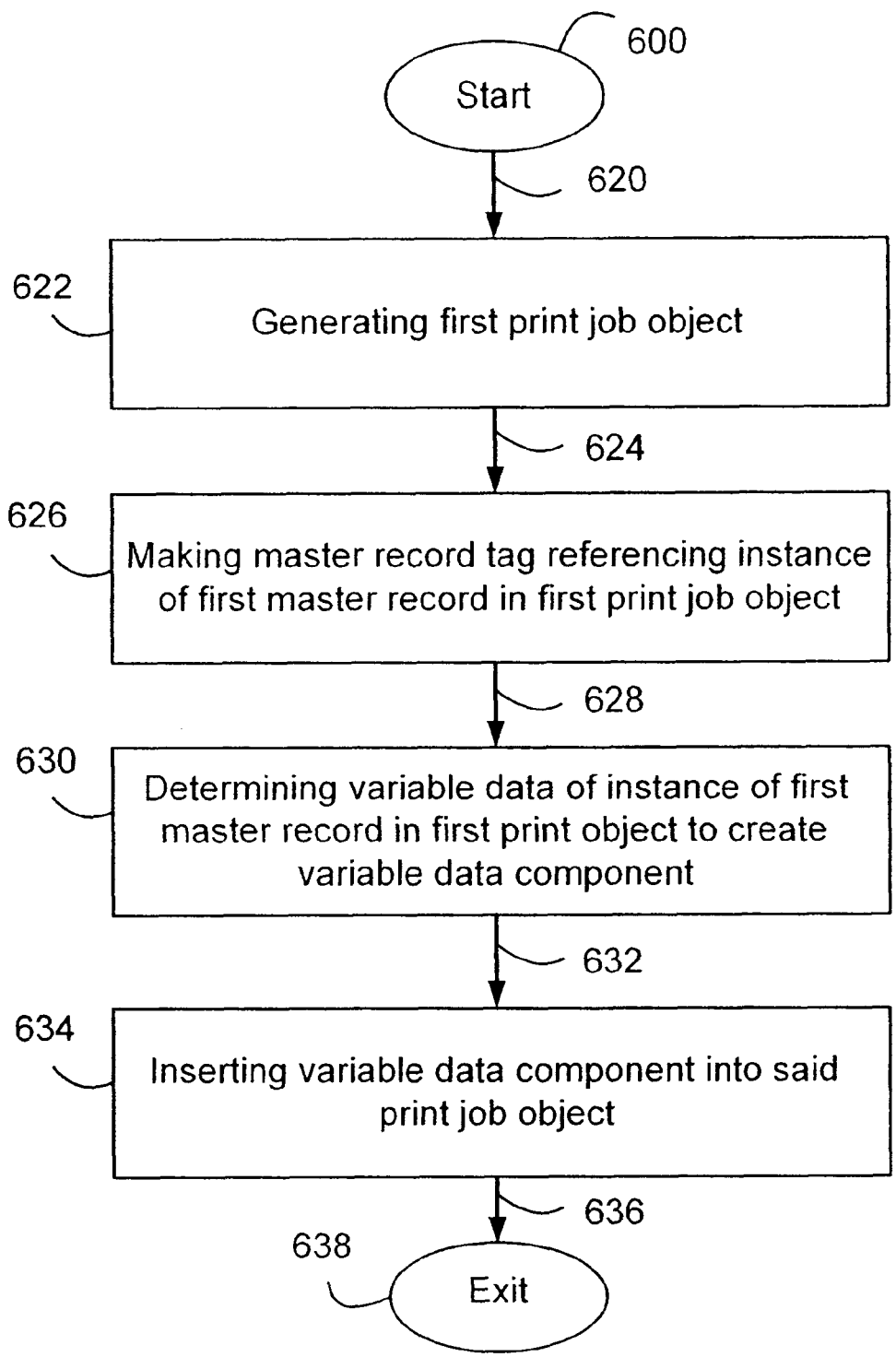
FIG. 10 depicts a detail of operation 600 of FIG. 9 in accordance with an aspect of the invention supporting processing variable data components of a print job object.

FIG. 10 depicts a detail of operation 600 of FIG. 9 in accordance with an aspect of the invention supporting processing variable data components of a print job object.

Arrow 620 directs the flow of execution from starting operation 600 to operation 622. Operation 622 performs generating a first print job object. Arrow 624 directs execution from operation 622 to operation 626. Operation 626 performs making a master record tag referencing the instance of the first master record in the first print job object. Arrow 628 directs execution from operation 626 to operation 630. Operation 630 performs determining variable data of the instance of the first master record in the first print object to create a variable data component. Arrow 632 directs execution from operation 630 to operation 634. Operation 634 performs inserting the variable data component into the first print job object. Arrow 636 directs execution from operation 634 to operation 638. Operation 638 terminates the operations of this flowchart.

Note that in certain embodiments, where the operations of this flowchart are used repeatedly to process a single print object, operation 622 would only be performed once to generate a new first print object.

Figure 11:
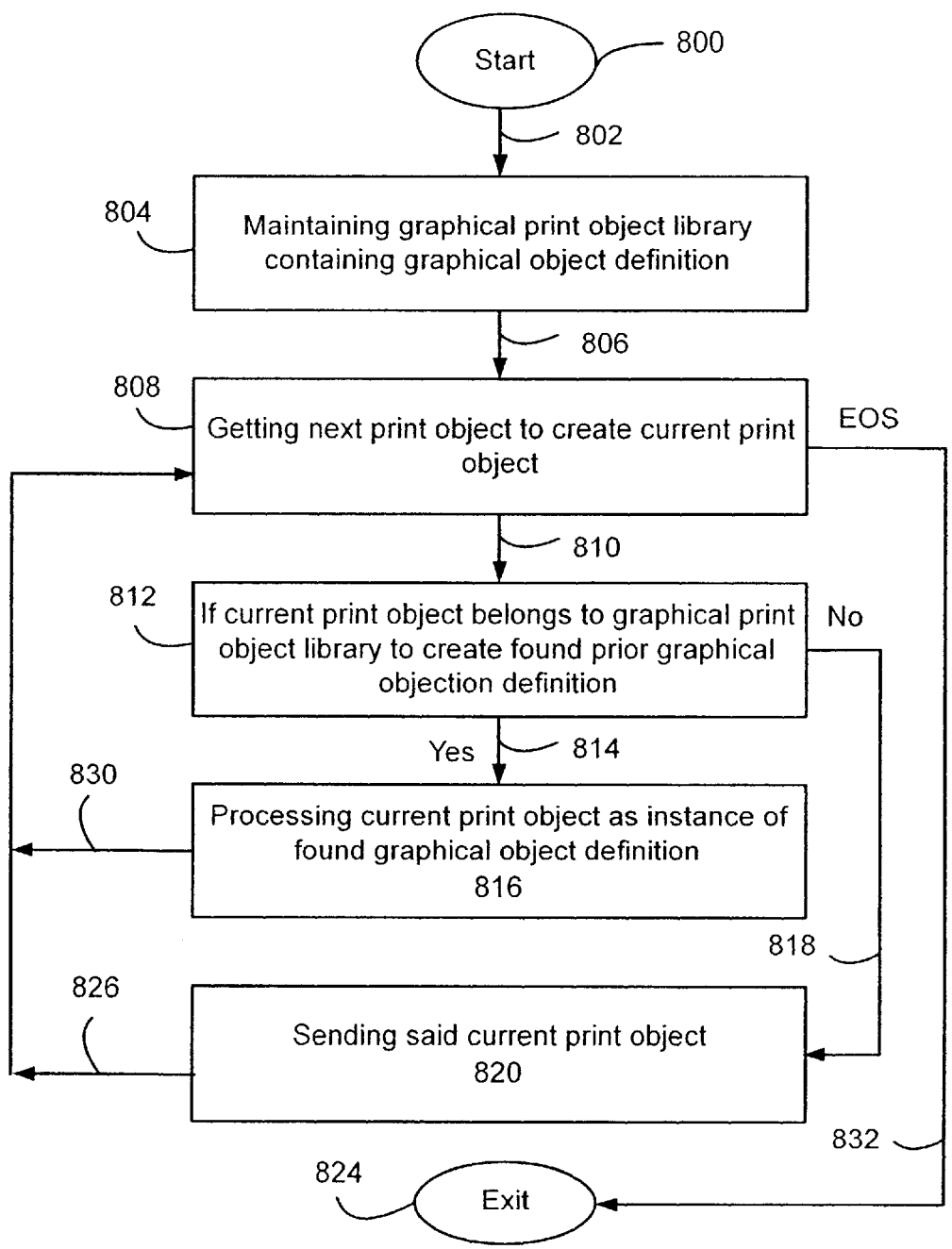
FIG. 11 depicts a flowchart for translating a print object stream containing a succession of print objects into a print job stream containing print job objects of certain embodiments in accordance with an aspect of the invention.

FIG. 11 depicts a flowchart for translating a print object stream containing a succession of print objects into a print job stream containing print job objects of certain embodiments in accordance with an aspect of the invention.

Operation 800 starts the operations of this flowchart. Arrow 802 directs the flow of execution from operation 800 to operation 804. Operation 804 performs maintaining a graphical print object library containing a graphical object definition.

Arrow 806 directs execution from operation 804 to operation 808. Operation 808 performs getting next print object to create a current print object. Arrow 810 directs execution from operation 808 to operation 812. Operation 812 performs determining if the current print object belongs to the graphical print object library to create a found prior graphical objection definition. Arrow 814 directs execution from operation 812 to operation 816. Operation 816 performs processing the current print object as instance of the found graphical object definition whenever the current print object belongs to the graphical print object library. Arrow 818 directs execution from operation 812 to operation 820. Operation 820 performs sending the current print object whenever the current print object does not belong to the graphical print object library. Arrow 826 directs execution from operation 820 to operation 808. Arrow 830 directs execution from operation 816 to operation 808.

Arrow 832 directs execution from operation 808 to operation 824 when getting next print object returns "EOS", which stands for End Of print Stream. Operation 824 terminates the operations of this flowchart.

Note that in certain embodiments, the operations of this flowchart may be applied in an iterative manner to the succession of print objects. In certain other embodiments, the operations of this flowchart may be applied based upon triggering an event. In certain further embodiments, the event may be triggered by the reception of a print object. In certain further embodiments, the print object may be treated as a message by elements of a real-time operating system. In certain further embodiments, the event may be part of a method of an instance of an object class.

Figure 12:
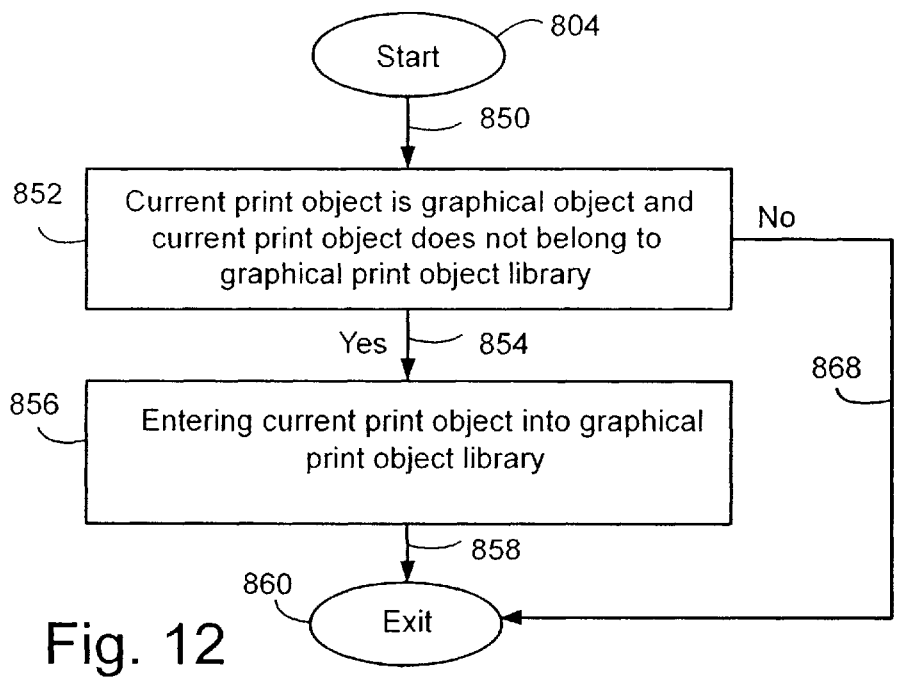
FIG. 12 depicts a detail flowchart of operation 804 of FIG. 11 in accordance with an aspect of the invention supporting entering the current print object into the graphical print object library.

FIG. 12 depicts a detail flowchart of operation 804 of FIG. 11 in accordance with an aspect of the invention supporting entering the current print object into the graphical print object library.

Arrow 850 directs the flow of execution from starting operation 804 to operation 852. Operation 852 determines whenever the current print object is a graphical object and whenever the current print object does not belong to the graphical print object library. Arrow 854 directs execution from operation 852 to operation 856 when the determination is 'Yes'. Operation 856 performs entering the current print object into the graphical print object library. Arrow 858 directs execution from operation 856 to operation 860. Arrow 868 directs execution from operation 852 to operation 860 when the determination is 'No'. Operation 860 terminates the operations of this flowchart.

Figure 13:
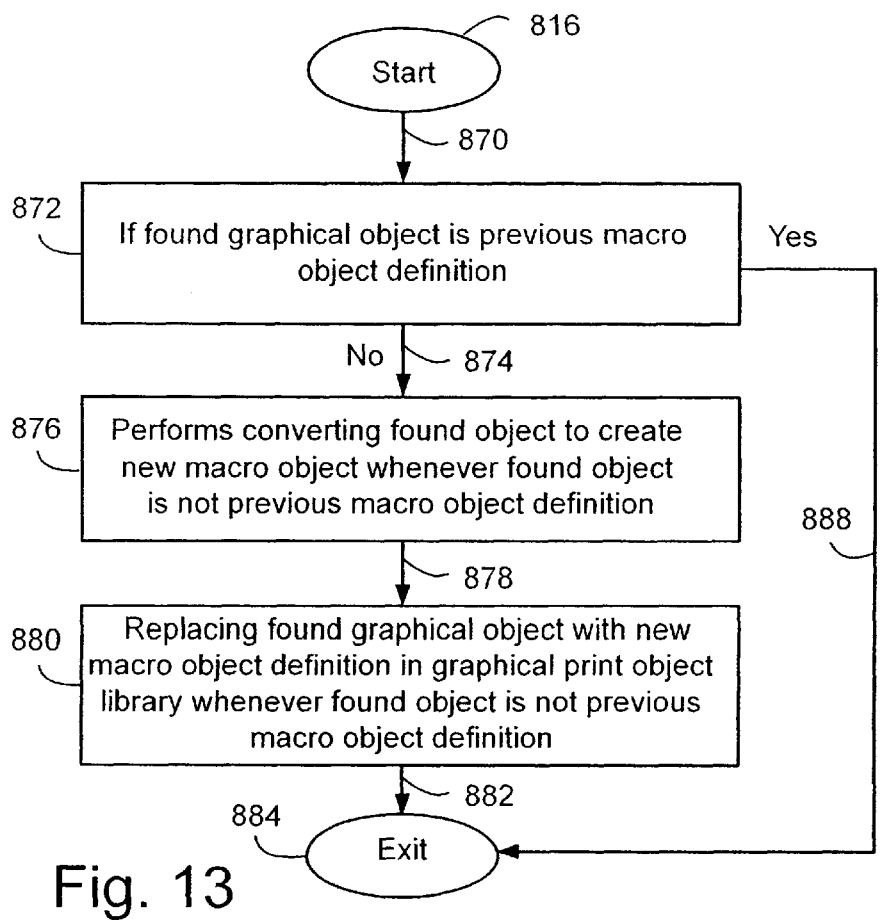
FIG. 13 depicts a detail flowchart of operation 816 of FIG. 11 in accordance with an aspect of the invention processing current print object as instance of found graphical object definition.

FIG. 13 depicts a detail flowchart of operation 816 of FIG. 11 in accordance with an aspect of the invention processing current print object as instance of found graphical object definition, supporting detecting whether the found graphical object definition is a previously defined macro definition, and modifying the graphical object library whenever the found graphical object definition is not a previously defined macro definition.

Arrow 870 directs the flow of execution from starting operation 816 to operation 872. Operation 872 performs determining whether the found graphical object is a previous macro object definition. Arrow 874 directs execution from operation 872 to operation 876 whenever the found object is determined not to be a previous macro object definition. Operation 876 performs converting the found object to create a new macro object whenever the found object is determined not to be a previous macro object definition. Arrow 878 directs execution from operation 876 to operation 880 whenever the found object is determined not to be a previous macro object definition. Operation 880 performs replacing the found graphical object with the new macro object definition in the graphical print object library whenever the found object is determined not to be a previous macro object definition. Arrow 882 directs execution from operation 880 to operation 884. Operation 884 terminates the operations of this flowchart.

Arrow 888 directs execution from operation 872 to operation 884 whenever the found object is determined to be a previous macro object definition. Operation 884 terminates the operations of this flowchart.

Note that in certain embodiments, this flowchart may be implemented for a flag driven processor in which branching operations are minimized. In such implementations, operations 874 and 878 would be performed based upon the flag state. In certain alternative embodiments, a branching mechanism might be employed, in which case arrow 874 would be active directing execution when the found graphical object is not a previous macro definition, and arrow 888 would be active when the found graphical object is a previous macro definition.

Figure 14:
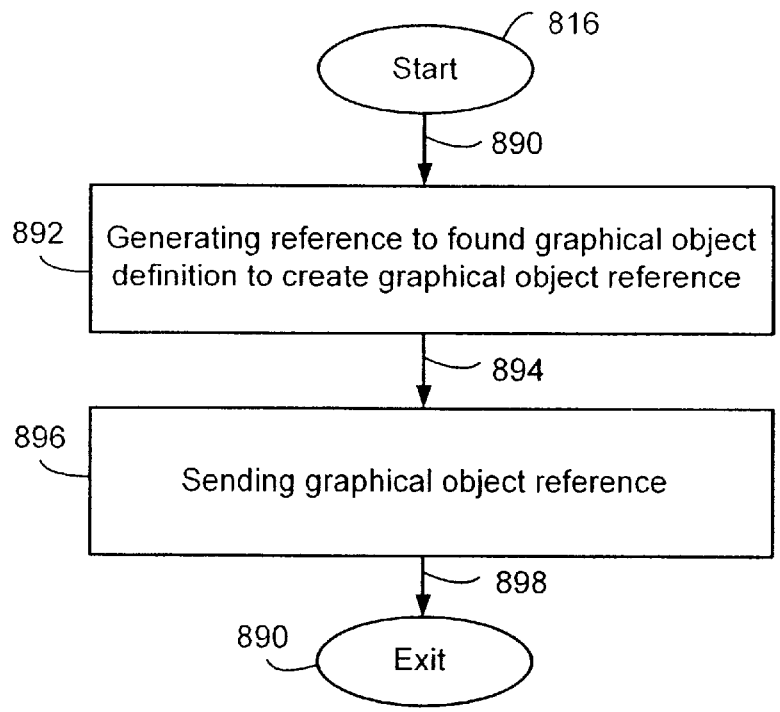
FIG. 14 depicts a detail flowchart of operation 816 of FIG. 11 in accordance with an aspect of the invention processing current print object as instance of found graphical object definition.

FIG. 14 depicts a detail flowchart of operation 816 of FIG. 11 in accordance with an aspect of the invention processing current print object as instance of found graphical object definition supporting generating and sending a found graphical object reference.

Arrow 890 directs the flow of execution from starting operation 816 to operation 892. Operation 892 performs generating a reference to the found graphical object definition to create a graphical object reference. Arrow 894 directs execution from operation 892 to operation 896. Operation 896 performs sending the graphical object reference. Arrow 898 directs execution from operation 896 to operation 900. Operation 900 terminates the operations of this flowchart.

Note that in certain embodiments, operation 896 entails creating a data structure containing the graphical object reference accessible by application program 302. In certain embodiments, operation 896 entails sending 308 the graphical object reference to printer spooler 310. In certain embodiments, operation 896 entails sending 308 the graphical object reference to printer spooler 310. In certain embodiments, operation 896 entails sending 312 the graphical object reference to printer job spooler 322. In certain embodiments, operation 896 entails sending 338 the graphical object reference to printer spooler 342. In certain embodiments, operation 896 entails sending 324 the graphical object reference to RIP process 326.

Figure 15:
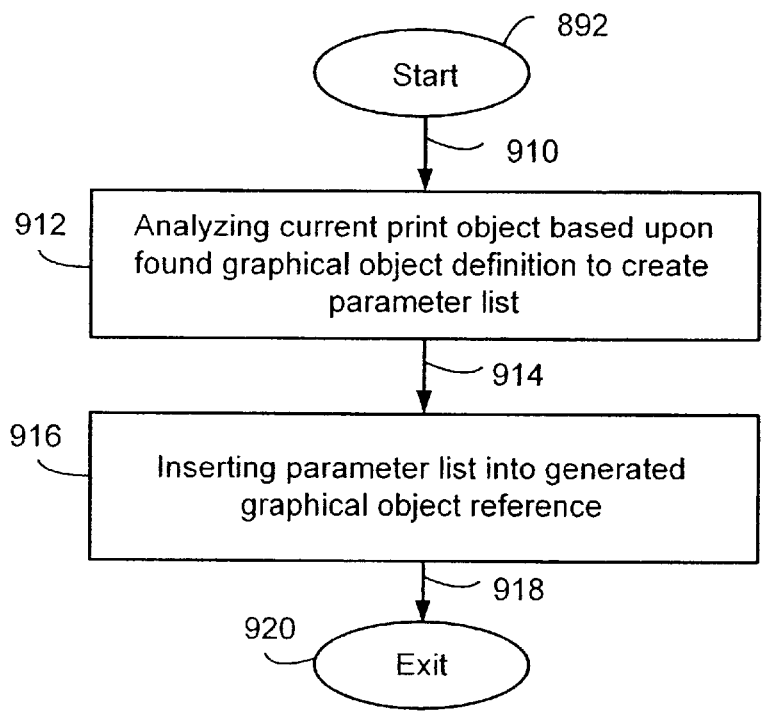
FIG. 15 depicts a detail flowchart of operation 892 of FIG. 14 in accordance with an aspect of the invention generating a reference to said found graphical object definition to create a graphical object reference further supporting parameter lists.

FIG. 15 depicts a detail flowchart of operation 892 of FIG. 14 in accordance with an aspect of the invention generating a reference to the found graphical object definition to create a graphical object reference further supporting parameter lists.

Arrow 910 directs the flow of execution from starting operation 892 to operation 912. Operation 912 performs analyzing the current print object based upon the found graphical object definition to create a parameter list. Arrow 914 directs execution from operation 912 to operation 916. Operation 916 performs inserting the parameter list into the generated graphical object reference. Arrow 918 directs execution from operation 916 to operation 920. Operation 920 terminates the operations of this flowchart.

Figure 16:
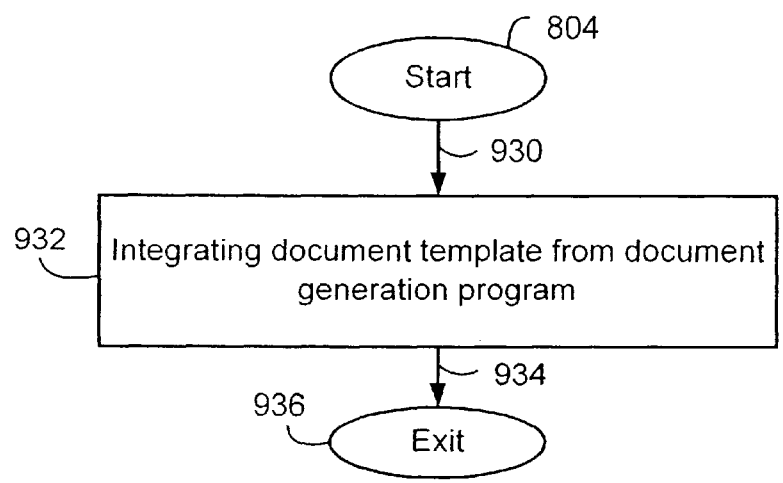
FIG. 16 depicts a detail flowchart of operation 804 of FIG. 11 in accordance with an aspect of the invention supporting integrating a document template from a document generation program.

FIG. 16 depicts a detail flowchart of operation 804 of FIG. 11 in accordance with an aspect of the invention supporting integrating a document template from a document generation program.

Arrow 930 directs the flow of execution from starting operation 804 to operation 932. Operation 932 performs integrating a document template from a document generation program. Arrow 934 directs execution from operation 932 to operation 936. Operation 936 terminates the operations of this flowchart.

In certain embodiments, a document template may be a file referenced by using a file management system component of an operating system. In certain embodiments, a document template may reside in computer readable memory. In certain embodiments, a document template may be embedded as part of the print object stream.

Figure 17:
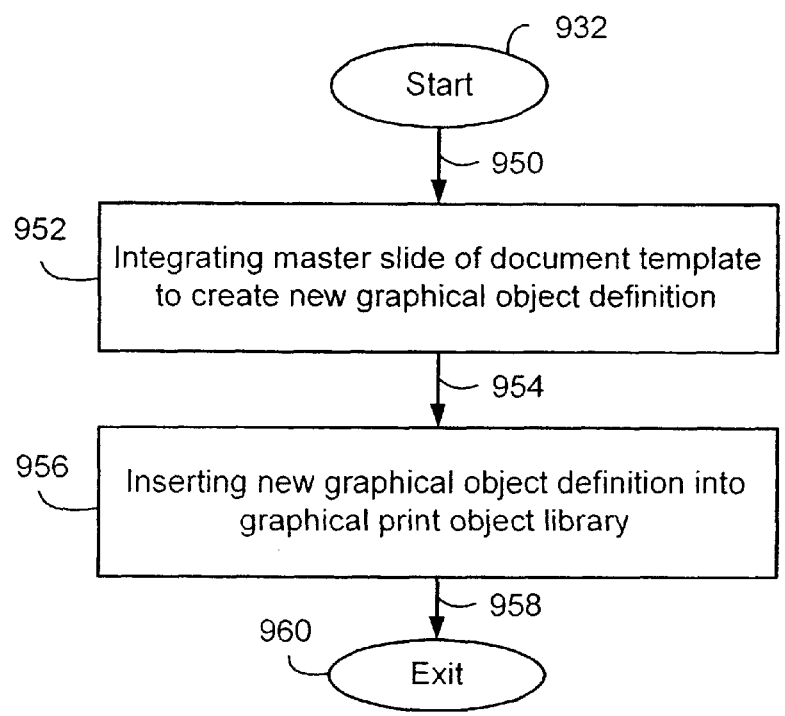
FIG. 17 depicts a detail flowchart of operation 932 of FIG. 16 in accordance with an aspect of the invention supporting integrating a document template from a document generation program supporting the integration of layouts.

FIG. 17 depicts a detail flowchart of operation 932 of FIG. 16 in accordance with an aspect of the invention supporting integrating a document template from a document generation program supporting the integration of layouts.

Arrow 950 directs the flow of execution from starting operation 932 to operation 952. Operation 952 performs integrating a master slide of the document template to create a new graphical object definition. Arrow 954 directs execution from operation 952 to operation 956. Operation 956 performs inserting the new graphical object definition into the graphical print object library. Arrow 958 directs execution from operation 956 to operation 960. Operation 960 terminates the operations of this flowchart.

Note that in certain embodiments, there may be more than one master slide in the document template, and that in such embodiments, iteration of this flowchart may be implemented. In certain embodiments, a user may designate master slides. In certain further embodiments, user designation of a master slide may be based upon position in the document template. In certain embodiments, master slides may also be referred to as layouts or layout templates.

Figure 18:
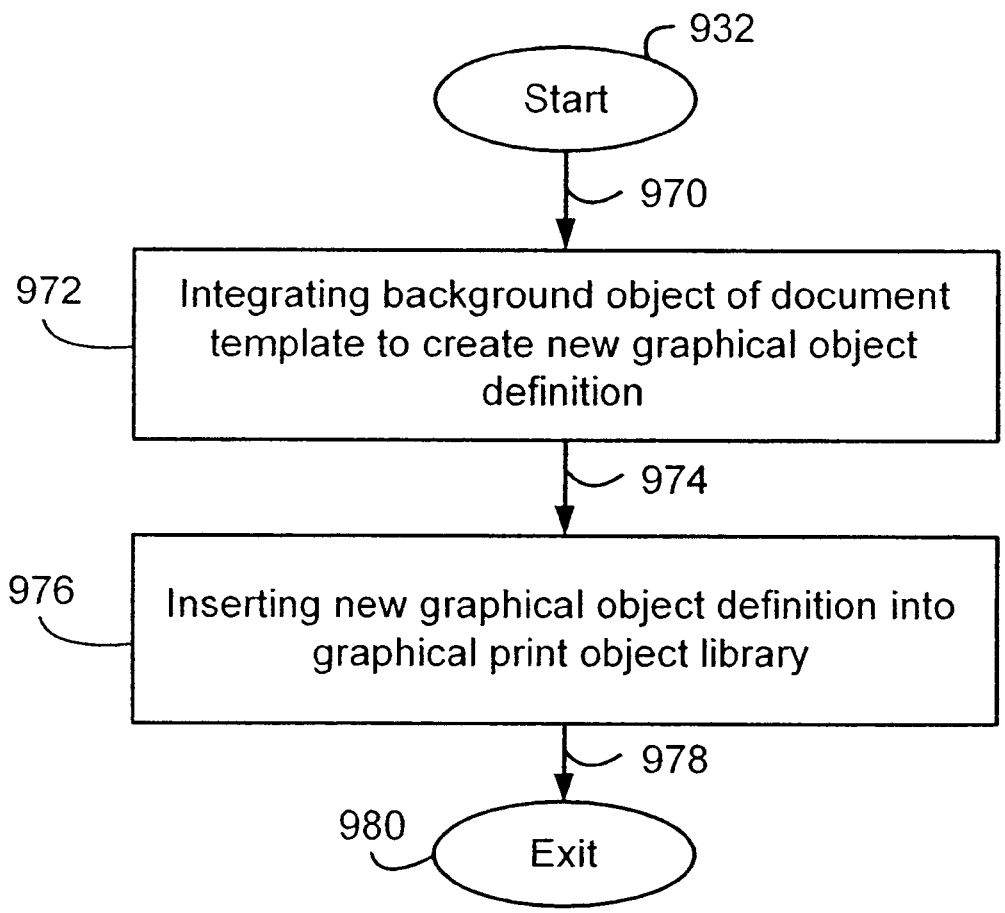
FIG. 18 depicts a detail flowchart of operation 932 of FIG. 16 in accordance with an aspect of the invention supporting integrating a document template from a document generation program supporting the integration of background objects.

FIG. 18 depicts a detail flowchart of operation 932 of FIG. 16 in accordance with an aspect of the invention supporting integrating a document template from a document generation program supporting the integration of background objects.

Arrow 970 directs the flow of execution from starting operation 932 to operation 972. Operation 972 performs integrating a background object of the document template to create a new graphical object definition. Arrow 974 directs execution from operation 972 to operation 976. Operation 976 performs inserting the new graphical object definition into the graphical print object library. Arrow 978 directs execution from operation 976 to operation 980. Operation 980 terminates the operations of this flowchart.

Note that in certain embodiments, background objects of a specific application program may also be known as layouts. In certain embodiments, there may be more than one background object in a document template.

Note that in certain embodiments, an aspect of the invention may be implemented as program code components in computer readable memory coupled to a user computer and executed upon the user computer to perform the translating method.

In certain further embodiments, at least one of the translating method program code components in the user computer coupled computer readable memory executes as an executable sub-program invoked within an application program the user operates and sending the print job stream to a print driver executing upon the user computer.

In another further embodiment, at least one of the translating method program code components in the user computer coupled computer readable memory executes as a plug-in of an application program the user operates and sending the print job stream to a print driver executing upon the user computer.

In another further embodiment, at least one of the translating method program code components in the user computer coupled computer readable memory executes as a filter between an application program the user operates and a print driver executing upon the user computer.

In another further embodiment, at least one of the translating method program code components in the user computer coupled computer readable memory executes as a print driver executing upon the user computer.

In another further embodiment, at least one of the translating method program code components in the user computer coupled computer readable memory executes as a filter between a print driver and a print spooler executing upon the user computer.

In another further embodiment, at least one of the translating method program code components in the user computer coupled computer readable memory executes as a print spooler executing upon the user computer.

In certain embodiments, the translating method is implemented as program code components in computer readable memory coupled to a server computer and executed upon the server computer to perform the translating method.

In certain embodiments, the translating method is implemented as program code components in computer readable memory coupled to an embedded of a printer and executed upon the embedded computer of the printer to perform the translating method.

The preceding embodiments have been provided by way of example and are not meant to constrain the scope of the following claims.

We claim:

1. A method of translating a print object stream containing a succession of print objects into a print job stream containing print job objects, comprising the steps of:

examining said print object stream to create a collection of at least one master record; and processing said print object stream to create variable data objects as instances of at least one of said master record of said collection of said master records in said print job stream.

2. A method of translating a print object stream containing a succession of print objects into a print job stream containing print job objects as recited in claim 1, wherein examining said print object stream to create a collection of at least one master record comprises a user designating a print object to create a master record in said collection of master records.

3. A method of translating a print object stream containing a succession of print objects into a print job stream containing print job objects as recited in claim 1, wherein examining said print object stream to create a collection of at least one master record comprises the steps of:
- determining if a first of said print objects is a layout definition; and
- designating a print object to create a master record in said collection of master records whenever said first print object is said layout definition.

4. A method of translating a print object stream containing a succession of print objects into a print job stream containing print job objects as recited in claim 1, wherein examining said print object stream to create a collection of at least one master record comprises the steps of:
- determining if a first of said print objects is a background definition; and
- designating said first print object to create a first master record in said collection of master records whenever said first print object is said background definition.

5. A method of translating a print object stream containing a succession of print objects into a print job stream containing print job objects as recited in claim 1, wherein processing said print object stream to create variable data objects as instances of at least one of said master record of said collection of said master records in the print job stream comprises the steps of:
- getting a first print object from said print object stream;
- determining if said first print object is an instance of a first master record of said master record collection;
- processing said first print object as an instance of said first master record in said print job stream whenever said first print object is instance of said first master record; and
- default processing said first print object whenever said first print object is not instance of said first master record.

6. A method of translating a print object stream containing a succession of print objects into a print job stream containing print job objects as recited in claim 5, wherein processing said first print object as an instance of said first master record in the print job stream whenever said first print object is an instance of said first master record comprises the steps of:
- generating a first print job object;
- making a master record tag referencing said instance of said first master record in said first print job object;
- determining variable data of said instance of said first master record in said first print object to create a variable data component; and
- inserting said variable data component into said first print job object.

7. A method of translating a print object stream containing a succession of print objects into a print job stream containing print job objects as recited in claim 1, wherein said translating method is implemented as program code components in computer readable memory coupled to a user computer and executed upon said user computer to perform said translating method.

8. A method of translating a print object stream containing a succession of print objects into a print job stream containing print job objects as recited in claim 7, wherein at least one of said translating method program code components in said user computer coupled computer readable memory executes as an executable sub-program invoked within an application program said user is operates and sending said print job stream to a print driver executing upon said user computer.

9. A method of translating a print object stream containing a succession of print objects into a print job stream containing print job objects as recited in claim 8, wherein at least one of said translating method program code components in said user computer coupled computer readable memory executes as a plug-in of an application program said user operates and sending said print job stream to a print driver executing upon said user computer.

10. A method of translating a print object stream containing a succession of print objects into a print job stream containing print job objects as recited in claim 7, wherein at least one of said translating method program code components in said user computer coupled computer readable memory executes as a filter between an application program said user operates and a print driver executing upon said user computer.

11. A method of translating a print object stream containing a succession of print objects into a print job stream containing print job objects as recited in claim 7, wherein at least one of said translating method program code components in said user computer coupled computer readable memory executes as a print driver executing upon said user computer.

12. A method of translating a print object stream containing a succession of print objects into a print job stream containing print job objects as recited in claim 7, wherein at least one of said translating method program code components in said user computer coupled computer readable memory executes as a filter between a print driver and a print spooler executing upon said user computer.

13. A method of translating a print object stream containing a succession of print objects into a print job stream containing print job objects as recited in claim 7, wherein at least one of said translating method program code components in said user computer coupled computer readable memory executes as a print spooler executing upon said user computer.

14. A method of translating a print object stream containing a succession of print objects into a print job stream containing print job objects as recited in claim 1, wherein said translating method is implemented as program code components in computer readable memory coupled to a server computer and executed upon said server computer to perform said translating method.

15. A method of translating a print object stream containing a succession of print objects into a print job stream containing print job objects as recited in claim 1, wherein said translating method is implemented as program code components in computer readable memory coupled to an embedded computer of a printer and executed upon said embedded computer of said printer to perform said translating method.

16. A method of translating a print object stream containing a succession of print objects into a print job stream containing master records and instance records, comprising the steps of:
- maintaining a graphical print object library containing a graphical object definition;

getting next print object to create a current print object;

determining if said current print object belongs to said graphical print object library to create a found prior graphical objection definition;

processing said current print object as instance of said found graphical object definition whenever said current print object belongs to said graphical print object library; and sending said current print object whenever said current print object does not belong to said graphical print object library.

17. A method of translating a print object stream containing a succession of print objects into a print job stream containing master records and instance records as recited in claim 16, wherein maintaining a graphical print object library comprises the steps of:

entering said current print object into said graphical print object library whenever said current print object is a graphical object and whenever said current print object does not belong to said graphical print object library.

18. A method of translating a print object stream containing a succession of print objects into a print job stream containing master records and instance records as recited in claim 16, wherein processing said current print object as instance of said found graphical object definition further comprises the steps of:

determining whether said found graphical object definition is a previous macro object definition;

converting said found object to create a new macro object definition whenever said found object is determined not to be a previous macro object definition; and replacing said found graphical object with said new macro object definition in said graphical print object library whenever said found object is determined not to be a previous macro object definition.

19. A method of translating a print object stream containing a succession of print objects into a print job stream containing master records and instance records as recited in claim 16, wherein processing said current print object as instance of said found graphical object definition further comprises the steps of:

generating a reference to said found graphical object definition to create a graphical object reference; and sending said graphical object reference.

20. A method of translating a print object stream containing a succession of print objects into a print job stream containing master records and instance records as recited in claim 19, wherein generating a graphical object reference is further comprises the steps of:

analyzing said current print object based upon said found graphical object definition to create a parameter list; and inserting said parameter list into said generated graphical object reference.

21. A method of translating a print object stream containing a succession of print objects into a print job stream containing master records and instance records as recited in claim 20, wherein said parameter list may include at least a scaling factor.

22. A method of translating a print object stream containing a succession of print objects into a print job stream containing master records and instance records as recited in claim 21, wherein said parameter list may include a first scaling parameter and a second scaling parameter.

23. A method of translating a print object stream containing a succession of print objects into a print job stream containing master records and instance records as recited in claim 21, wherein said parameter list may include an orientation parameter.

24. A method of translating a print object stream containing a succession of print objects into a print job stream containing master records and instance records as recited in claim 21, wherein said parameter list may include a text parameter.

25. A method of translating a print object stream containing a succession of print objects into a print job stream containing master records and instance records as recited in claim 16 further comprising the steps of:

maintaining a graphical print object library containing a graphical object definition further comprises integrating a document template from a document generation program.

26. A method of translating a print object stream containing a succession of print objects into a print job stream containing master records and instance records as recited in claim 25, wherein integrating said document template from said document generation program further comprises the steps of:

integrating a master slide of said document template to create a new graphical object definition; and inserting said new graphical object definition into said graphical print object library.

27. A method of translating a print object stream containing a succession of print objects into a print job stream containing master records and instance records as recited in claim 25, wherein integrating said document template from said document generation program further comprises the steps of:

integrating a background object of said document template to create a new graphical object definition; and inserting said new graphical object definition into said graphical print object library.

28. A method of translating a print object stream containing a succession of print objects into a print job stream containing master records and instance records as recited in claim 16, wherein said translating method is implemented as program code components in computer readable memory coupled to a user computer and executed upon said user computer to perform said translating method.

29. A method of translating a print object stream containing a succession of print objects into a print job stream containing master records and instance records as recited in claim 28, wherein at least one of said translating method program code components in said user computer coupled computer readable memory executes as an executable subprogram invoked within an application program said user operates and sending said print job stream to a print driver executing upon said user computer.

30. A method of translating a print object stream containing a succession of print objects into a print job stream containing master records and instance records as recited in claim 29, wherein at least one of said translating method program code components in said user computer coupled computer readable memory executes as a plug-in of an application program said user operates and sending said print job stream to a print driver executing upon said user computer.

31. A method of translating a print object stream containing a succession of print objects into a print job stream containing master records and instance records as recited in claim 28, wherein at least one of said translating method program code components in said user computer coupled computer readable memory executes as a filter between an application program said user operates and a print driver executing upon said user computer.

32. A method of translating a print object stream containing a succession of print objects into a print job stream containing master records and instance records as recited in claim 28, wherein at least one of said translating method program code components in said user computer coupled computer readable memory executes as a print driver executing upon said user computer.

33. A method of translating a print object stream containing a succession of print objects into a print job stream containing master records and instance records as recited in claim 28, wherein at least one of said translating method program code components in said user computer coupled computer readable memory executes as a filter between a print driver and a print spooler executing upon said user computer.

34. A method of translating a print object stream containing a succession of print objects into a print job stream containing master records and instance records as recited in claim 28, wherein at least one of said translating method program code components in said user computer coupled computer readable memory executes as a print spooler executing upon said user computer.

35. A method of translating a print object stream containing a succession of print objects into a print job stream containing master records and instance records as recited in claim 16, wherein said translating method is implemented as program code components in computer readable memory coupled to a server computer and executed upon said server computer to perform said translating method.

36. A method of translating a print object stream containing a succession of print objects into a print job stream containing master records and instance records as recited in claim 16, wherein said translating method is implemented as program code components in computer readable memory coupled to an embedded of a printer and executed upon said embedded computer of said printer to perform said translating method.

* * * * *